(12) United States Patent
Hattori et al.

(10) Patent No.: US 8,859,660 B2
(45) Date of Patent: *Oct. 14, 2014

(54) RUBBER COMPOSITION FOR STUDLESS TIRE AND STUDLESS TIRE USING THE SAME

(75) Inventors: Takayuki Hattori, Kobe (JP); Ryoji Kojima, Kobe (JP); Naohiko Kikuchi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 263 days.

This patent is subject to a terminal disclaimer.

(21) Appl. No.: 12/484,369

(22) Filed: Jun. 15, 2009

(65) Prior Publication Data

US 2010/0056684 A1    Mar. 4, 2010

(30) Foreign Application Priority Data

Sep. 1, 2008    (JP) ................................ 2008-224047

(51) Int. Cl.
| | |
|---|---|
| *B60C 1/00* | (2006.01) |
| *C08K 5/098* | (2006.01) |
| *C08K 3/04* | (2006.01) |
| *C08K 5/00* | (2006.01) |
| *C08K 5/01* | (2006.01) |
| *C08L 7/00* | (2006.01) |
| *C08L 9/00* | (2006.01) |
| *C08L 21/00* | (2006.01) |

(52) U.S. Cl.
CPC ............... *C08L 9/00* (2013.01); *C08L 2666/08* (2013.01); *C08K 3/04* (2013.01); *B60C 1/0016* (2013.01); *C08K 5/0016* (2013.01); *C08K 5/01* (2013.01); *C08K 5/098* (2013.01); *C08L 21/00* (2013.01); *C08L 7/00* (2013.01)
USPC ............................. 524/394; 524/396; 524/399

(58) Field of Classification Search
CPC ........ B60C 1/0016; C08K 5/098; C08K 3/04; C08K 5/0016; C08K 5/01; C08L 7/00; C08L 21/00; C08L 9/00; C08L 2666/08
USPC .......................................... 524/394, 396, 399
See application file for complete search history.

(56) References Cited

U.S. PATENT DOCUMENTS

| | | | | | |
|---|---|---|---|---|---|
| 5,302,315 | A | * | 4/1994 | Umland ................... | 252/182.14 |
| 5,623,007 | A | * | 4/1997 | Kuebler ..................... | 524/105 |
| 8,329,799 | B2 | * | 12/2012 | Kojima ..................... | 524/398 |
| 2004/0211111 | A1 | | 10/2004 | Kikuchi | |
| 2005/0032960 | A1 | * | 2/2005 | Kishimoto et al. ......... | 524/432 |
| 2005/0234165 | A1 | * | 10/2005 | Schaal et al. ............... | 524/210 |
| 2009/0176910 | A1 | | 7/2009 | Anbe et al. | |
| 2010/0317782 | A1 | * | 12/2010 | Hattori et al. ............. | 524/300 |

FOREIGN PATENT DOCUMENTS

| | | |
|---|---|---|
| EP | 1 961 785 A1 | 8/2008 |
| JP | 8-188673 A | 7/1996 |
| JP | 2002-97304 A | 4/2002 |
| JP | 2003-213039 A | 7/2003 |
| JP | 1580111 A | 2/2005 |
| JP | 2006-063094 * | 3/2006 |
| JP | 2006-63094 A | 3/2006 |
| JP | 2007-176417 A | 7/2007 |
| JP | 2007-204735 A | 8/2007 |
| JP | 2007-321041 A | 12/2007 |
| WO | WO 2007/081018 A1 | 7/2007 |

OTHER PUBLICATIONS

English machine translation of JP 2006-063094 to Minakoshi.*
Office Action dated May 10, 2011 for corresponding Japanese Application No. 2008-224047.

\* cited by examiner

*Primary Examiner* — Angela C Scott
(74) *Attorney, Agent, or Firm* — Birch, Stewart, Kolasch & Birch, LLP

(57) ABSTRACT

The present invention has its object to provide a rubber composition for a studless tire that contributes to both good braking force and high handling stability on ice or snow, and a high performance studless tire using the rubber composition. The rubber composition for the studless tire contains: a mixture of a zinc salt of an aliphatic carboxylic acid and a zinc salt of an aromatic carboxylic acid; an oil or a plasticizer; and a rubber component that comprises 40% by mass or more of a butadiene rubber relative to 100% by mass of a total amount of the rubber component.

6 Claims, No Drawings

RUBBER COMPOSITION FOR STUDLESS TIRE AND STUDLESS TIRE USING THE SAME

TECHNICAL FIELD

The present invention relates to a rubber composition for a studless tire (a winter tire) and a studless tire using the same.

BACKGROUND ART

Use of spike tires has been banned by law in Japan so as to prevent powder dust pollution resulting from the spike tires, and thus studless tires are now used instead of the spike tires in cold regions. In order to improve grip performance of the studless tires on ice or snow, there is a method that decreases an elastic modulus at low temperatures and improves traction. Particularly, the braking force on ice is largely affected by an effective-contact area between rubber and ice. In order to enlarge the effective-contact area, a rubber has been desired which is flexible at low temperatures.

On the other hand, where the hardness of rubber alone is decreased using a method that comprises, for example, increasing the amount of oil, there is a problem that the handling stability decreases.

Generally, a natural rubber or a butadiene rubber is often used as a main ingredient in a tread rubber of a studless tire (for example, see JP 2007-176417 A). This is because these rubbers have a low glass transition temperature and flexibility even though they have high strength. However, reversion occurs when the natural rubber or butadiene rubber is sulfur-vulcanized. In this phenomenon, rubber degrades or its cross-linked state deteriorates, so that the elastic modulus at low temperatures also decreases. However, the inventors of the present invention have found from their studies that the hardness also excessively decreases and thus the handling stability and the abrasion resistance decrease. In addition, the reversion may increase tan δ at high temperatures excessively, thereby decreasing fuel economy.

For some tires including studless tires, vulcanization is performed at higher temperatures in order to increase the productivity of tires. In this case, the above phenomenon, particularly, is more pronounced. Accordingly, there is an additional problem of decrease in abrasion resistance caused by the reversion.

In order to suppress the reversion of a rubber composition that is capable of being vulcanized and is used for rubber products such as tires and to improve the heat resistance of the rubber composition, there have been known a method including increasing an amount of a vulcanization accelerator to be added to sulfur as a vulcanizing agent, a method including blending a thiuram-type vulcanization accelerator as a vulcanization accelerator, and the like. Furthermore, PERKALINK 900 and Duralink HTS (produced by Flexsys), Vulcuren KA9188 (produced by Bayer AG), and the like are known as cross-linking agents that are capable of generating long chain crosslinks represented as —$(CH_2)_6$—S— and the like. It is known that blending such cross-linking agents in the rubber composition makes it possible to suppress the reversion of the rubber composition. However, although such methods have an effect on suppressing the reversion of a natural rubber and an isoprene rubber, they have no effect or little effect on suppressing the reversion of a butadiene rubber.

SUMMARY OF THE INVENTION

An object of the present invention is to solve the above problems and provide a rubber composition for a studless tire that contributes to both good braking force and high handling stability on ice or snow, and a high performance studless tire using the rubber composition. Further, another object of the present invention is to provide the rubber composition and the studless tire at higher productivity and at a lower price for customers.

The present invention relates to a rubber composition for a studless tire, containing: a mixture of a zinc salt of an aliphatic carboxylic acid and a zinc salt of an aromatic carboxylic acid; an oil or a plasticizer; and a rubber component that comprises 40% by mass or more of a butadiene rubber relative to 100% by mass of a total amount of the rubber component.

The rubber composition desirably further contains silica in an amount of 10 parts by mass or more per 100 parts by mass of the rubber component.

The present invention also relates to a studless tire comprising a tread made of the above rubber composition.

BEST MODE FOR CARRYING OUT THE INVENTION

A rubber composition for a studless tire of the present invention contains: a mixture of a zinc salt of an aliphatic carboxylic acid and a zinc salt of an aromatic carboxylic acid; an oil or a plasticizer; and a rubber component that comprises 40% by mass or more of a butadiene rubber relative to 100% by mass of a total amount of the rubber component.

The rubber composition contains the butadiene rubber in an amount of 40% by mass or more relative to 100% by mass of a total amount of the rubber component. Blending the butadiene rubber can improve the braking performance of the studless tire on ice and the handling stability of the studless tire on ice and snow. The lower limit of the butadiene rubber content is desirably 45% by mass, more desirably 55% by mass, and even more desirably 60% by mass. From the point of view of the braking force and the handling stability on ice and snow, higher content of the butadiene rubber is more desirable, and thus the butadiene rubber content is desirably 80% by mass or more and most desirably 100% by mass. If the butadiene rubber content is less than 40% by mass, the glass transition temperature tends not to decrease and the braking force on ice or snow may decrease. On the other hand, if the butadiene rubber content is too high, the mechanical strength and the abrasion resistance tend to decrease although good performance on ice and snow may be achieved. In such a case, the butadiene rubber content may be desirably 85% by mass or less, more desirably 75% by mass or less, and even more desirably 65% by mass or less. According to the present invention, it is possible to increase a butadiene rubber content so as to contribute to both abrasion resistance and performance on ice and snow.

As the butadiene rubber, a butadiene rubber may be blended which has a cis content of 95% or more and has a viscosity of a 5% solution in toluene of 80 cps or more at 25° C. Blending such a butadiene rubber can improve the processability and the abrasion resistance. The above viscosity is desirably 200 cps or less. The butadiene rubber with the viscosity exceeding 200 cps may be too viscous, thereby tending to decrease the processability and not to be easily mixed with other rubbers. The lower limit of the viscosity is more desirably 110 cps and the upper limit thereof is more desirably 150 cps.

It is possible to improve the abrasion resistance if a butadiene rubber having a molecular weight distribution (Mw/Mn) of 3.0 or less is used. Further, a butadiene rubber with a Mw/Mn of 3.0 to 3.4 may be used. Use of such a butadiene rubber can improve both processability and abrasion resistance.

If a mixture of a butadiene rubber and another rubber is used as the rubber component, the another rubber is not particularly limited. Examples of the another rubber include natural rubbers (NR), epoxidized natural rubbers (ENR), styrene-butadiene rubbers (SBR), isoprene rubbers (IR), ethylene propylene diene rubbers (EPDM), chloroprene rubbers (CR), acrylonitrile butadiene rubbers (NBR), butyl rubbers (IIR), and halogenated butyl rubbers (X-IIR). It is particularly desirable that the NR and/or the ENR be contained because it is possible to be environment friendly, to prepare for a future decrease in oil supply, and to improve the abrasion resistance.

The rubber component may comprise at least one functional group (hereinafter referred to as the functional group) selected from the group consisting of alkoxy, alkoxysilyl, epoxy, glycidyl, carbonyl, ester, hydroxy, amino, and silanol. Commercially available rubber or its appropriately modified rubber may be used as a rubber comprising the functional group.

In the case of using the butadiene rubber mixed with a natural rubber and/or a polyisoprene rubber, the total amount of these rubbers in the rubber component is desirably 70% by mass or more. With the amount of 70% by mass or more, it is possible to achieve both good performance on ice and snow and good abrasion resistance, and thereby increase the reversion resistance. The amount of these rubbers is more desirably 80% by mass or more, even more desirably 90% by mass or more, and most desirably 100% by mass.

The rubber composition contains a zinc salt of an aliphatic carboxylic acid and a zinc salt of an aromatic carboxylic acid. The zinc salts have an effect on particularly the reversion of the butadiene rubber, and can improve the processability of a composition containing silica, so that the reversion of the composition containing silica can be more effectively suppressed.

Examples of the aliphatic carboxylic acid include aliphatic carboxylic acids derived from vegetable oils such as coconut oil, palm kernel oil, camellia oil, olive oil, almond oil, canola oil, peanut oil, rice bran oil, cacao butter, palm oil, soybean oil, cottonseed oil, sesame oil, linseed oil, castor oil and rapeseed oil; aliphatic carboxylic acids derived from animal oils such as beef tallow; and aliphatic carboxylic acids chemically synthesized from petroleum or the like. A desirable aliphatic carboxylic acid is the aliphatic carboxylic acid derived from vegetable oils, and a more desirable one is the aliphatic carboxylic acid derived from coconut oil, palm kernel oil or palm oil, because it is possible to be environment friendly, to prepare for a future decrease in oil supply, and to improve the abrasion resistance sufficiently.

The number of carbon atoms in the aliphatic carboxylic acid is desirably 4 or more, and more desirably 6 or more. If the number of carbon atoms is less than 4, the dispersibility tends to decrease. The number of carbon atoms in the aliphatic carboxylic acid is desirably 16 or less, more desirably 14 or less, and even more desirably 12 or less. If the number of carbon atoms exceeds 16, the reversion tends not to be sufficiently suppressed.

Here, an aliphatic group in the aliphatic carboxylic acid may be one having a chain structure such as an alkyl group or one having a ring structure such as a cycloalkyl group.

Examples of the aromatic carboxylic acid include benzoic acid, phthalic acid, mellitic acid, hemimellitic acid, trimellitic acid, diphenic acid, toluic acid, and naphthoic acid. Among these, the benzoic acid, phthalic acid, or naphthoic acid is desirable because it is possible to suppress the reversion sufficiently.

A content ratio between the zinc salt of the aliphatic carboxylic acid and the zinc salt of the aromatic carboxylic acid in a mixture thereof [molar ratio: (the zinc salt of the aliphatic carboxylic acid)/(the zinc salt of the aromatic carboxylic acid), hereinafter referred to as the "content ratio"] is desirably 1/20 or more, more desirably 1/15 or more, and even more desirably 1/10 or more. If the content ratio is less than 1/20, it may be impossible to be environment friendly and to prepare for a future decrease in oil supply, and the dispersibility and stability of the mixture tend to worsen. Furthermore, the content ratio is desirably 20/1 or less, more desirably 15/1 or less, and even more desirably 10/1 or less. If the content ratio is more than 20/1, the reversion tends not to be sufficiently suppressed.

The zinc content in the mixture is desirably 3% by mass or more, and more desirably 5% by mass or more. If the zinc content in the mixture is less than 3% by mass, the reversion tends not to be sufficiently suppressed. Furthermore, the zinc content in the mixture is desirably 30% by mass or less, and more desirably 25% by mass or less. If the zinc content in the mixture exceeds 30% by mass, the processability tends to decrease and the cost may unnecessarily increase.

The content of the mixture per 100 parts by mass of the rubber component is 0.2 parts by mass or more, desirably 0.5 parts by mass or more, even more desirably 1.0 part by mass or more, and most desirably 1.4 parts by mass or more. If the content of the mixture is less than 0.2 parts by mass, sufficient reversion resistance may not be ensured and it may be difficult to obtain sufficiently improved effects thereof. The content of the mixture is 10 parts by mass or less, desirably 7 parts by mass or less, and even more desirably 5 parts by mass or less. If the content of the mixture exceeds 10 parts by mass, the blooming tends to occur, smaller effects may be exerted relative to the addition amount of the mixture, and the cost may unnecessarily increase.

The above rubber composition contains an oil or a plasticizer. This makes it possible to adjust the hardness suitably low and achieve good braking performance on ice. Examples of the oil or plasticizer may include paraffinic process oils, aromatic process oils, and naphthenic process oils. Particularly, the paraffinic process oils are preferably used because the low-temperature properties can be improved and excellent performance on ice can be achieved. Specific examples of the paraffinic process oils may include PW-32, PW-90, PW-150 and PS-32 which are produced by Idemitsu Kosan Co., Ltd. Further, specific examples of the aromatic process oils may include AC-12, AC-460, AH-16, AH-24 and AH-58 which are produced by Idemitsu Kosan Co., Ltd.

The amount of the oil or plasticizer per 100 parts by mass of the rubber component is desirably 5 parts by mass or more, more desirably 10 parts by mass or more, and even more desirably 15 parts by mass or more. If the amount is less than 5 parts by mass, it may be difficult to sufficiently improve the performance on ice. Meanwhile, the amount thereof per 100 parts by mass of the rubber component is desirably 60 parts by mass or less, more desirably 40 parts by mass or less, and even more desirably 30 parts by mass or less. If the oil or plasticizer is contained too much, the abrasion resistance may decrease and the reversion resistance may also decrease. Further, even in the case of an aromatic oil or an alternative aromatic oil which leads to a comparatively small decrease in abrasion resistance, the performance on ice and snow may decrease due to a deterioration in low-temperature properties and the rolling resistance may decrease due to an increase in tan δ at high temperatures.

It is desirable that the rubber composition further contains silica. Blending silica can improve the braking performance on ice and the handling stability on ice and snow which are important for studless tires. In particular, the mixture of the zinc salt of the aliphatic carboxylic acid and the zinc salt of the aromatic carboxylic acid can improve the processability of the composition containing silica and can more effectively suppress the reversion of the composition containing silica. Examples of the silica include, but are not limited to, silica produced by a wet process, silica produced by a dry process, and the like.

A nitrogen adsorption specific surface area ($N_2SA$) of the silica is 40 m$^2$/g or more, and desirably 50 m$^2$/g or more. If the $N_2SA$ of the silica is less than 40 m$^2$/g, its reinforcing effect may be insufficient. The $N_2SA$ of the silica is 450 m$^2$/g or less, and desirably 400 m$^2$/g or less. If the $N_2SA$ of the silica exceeds 450 m$^2$/g, the dispersibility may decrease and heat generation in the rubber composition may increase; thus, this value is not desirable.

The silica content per 100 parts by mass of the rubber component is desirably 10 parts by mass or more, more desirably 15 parts by mass or more, even more desirably 20 parts by mass or more, and most desirably 35 parts by mass or more. If the silica content is less than 10 parts by mass, the braking performance on ice and the handling stability on ice and snow tend not to be improved. Furthermore, the silica content per 100 parts by mass of the rubber component is 150 parts by mass or less, desirably 120 parts by mass or less, more desirably 100 parts by mass or less, and most desirably 50 parts by mass or less. If the silica content exceeds 150 parts by mass, the processability and the workability may decrease; thus, this value is not desirable.

It is desirable that the rubber composition contains a silane coupling agent.

Any silane coupling agents conventionally used with silica in the rubber industries can be used as the silane coupling agent. Examples thereof include: sulfide-type silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl) tetrasulfide, bis(3-triethoxysilylpropyl)trisulfide, bis(2-triethoxysilylethyl)trisulfide, bis(4-triethoxysilylbutyl) trisulfide, bis(3-trimethoxysilylpropyl)trisulfide, bis(2-trimethoxysilylethyl)trisulfide, bis(4-trimethoxysilylbutyl) trisulfide, bis(3-triethoxysilylpropyl)disulfide, bis(2-triethoxysilylethyl)disulfide, bis(4-triethoxysilylbutyl) disulfide, bis(3-trimethoxysilylpropyl)disulfide, bis(2-trimethoxysilylethyl)disulfide, bis(4-trimethoxysilylbutyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazol tetrasulfide, 3-triethoxysilylpropylmethacrylate monosulfide, and 3-trimethoxysilylpropylmethacrylate monosulfide; mercapto-type silane coupling agents such as 3-mercaptopropyl trimethoxysilane, 3-mercaptopropyl triethoxysilane, 2-mercaptoethyl trimethoxysilane, and 2-mercaptoethyl triethoxysilane; vinyl-type silane coupling agents such as vinyl triethoxysilane, and vinyl trimethoxysilane; amino-type silane coupling agents such as 3-aminopropyl triethoxysilane, 3-aminopropyl trimethoxysilane, 3-(2-aminoethyl)aminopropyl triethoxysilane, and 3-(2-aminoethyl)aminopropyl trimethoxysilane; glycidoxy-type silane coupling agents such as γ-glycidoxypropyl triethoxysilane, γ-glycidoxypropyl trimethoxysilane, γ-glycidoxypropyl methyldiethoxysilane, and γ-glycidoxypropyl methyldimethoxysilane; nitro-type silane coupling agents such as 3-nitropropyl trimethoxysilane, and 3-nitropropyl triethoxysilane; chloro-type silane coupling agents such as 3-chloropropyl trimethoxysilane, 3-chloropropyl triethoxysilane, 2-chloroethyl trimethoxysilane, and 2-chloroethyl triethoxysilane. Each of these silane coupling agents may be used alone, or two or more of these may be used in combination.

The content of the silane coupling agent per 100 parts by mass of the silica is 1 part by mass or more, and desirably 2 parts by mass or more. If the content of the silane coupling agent is less than 1 part by mass, effects of blending the silane coupling agent may not be sufficiently exerted. Furthermore, the content of the silane coupling agent per 100 parts by mass of the silica is 20 parts by mass or less, and desirably 15 parts by mass or less. If the content of the silane coupling agent exceeds 20 parts by mass, no effects commensurate with the cost increase may be exerted on coupling and the reinforcement and the abrasion resistance may decrease; thus, this value is not desirable.

The rubber composition may contain a compounding ingredient conventionally used in the rubber industries, in addition to the rubber component, the mixture of the zinc salt of the aliphatic carboxylic acid and the zinc salt of the aromatic carboxylic acid, the oil, the plasticizer, the silica and the silane coupling agent. Examples of the compounding ingredient may include stearic acid; fillers such as a carbon black and eggshell powder; antioxidants; antiozonants; antiaging agents; vulcanization acceleration aids; zinc oxide; peroxides; vulcanizing agents such as sulfur and a sulfur-containing compound; and vulcanization accelerators.

The carbon black desirably has an average particle size of 30 nm or less and/or a DBP oil absorption of 100 ml/100 g or more. Blending such a carbon black can impart required reinforcement of studless tires to treads and ensure the block rigidity, handling stability, partial-abrasion resistance, and abrasion resistance. The viscosity of a rubber composition containing a carbon black tends to increase and thereby the processability tends to decrease; however, by using the mixture of the zinc salt of the aliphatic carboxylic acid and the zinc salt of the aromatic carboxylic acid, it is possible to lower the viscosity of unvulcanized rubber so as to improve the processability.

The carbon black content per 100 parts by mass of the rubber component is 2 parts by mass or more, desirably 4 parts by mass or more, more desirably 8 parts by mass or more, and most desirably 20 parts by mass or more. If the carbon black content is less than 2 parts by mass, the reinforcement may be insufficient and thus it may be difficult to ensure the required block rigidity, handling stability, partial-abrasion resistance, and abrasion resistance. Furthermore, the carbon black content per 100 parts by mass of the rubber component is 120 parts by mass or less, desirably 80 parts by mass or less, and more desirably 40 parts by mass or less. If the carbon black content exceeds 120 parts by mass, the processability may decrease and the hardness may increase too high.

The rubber composition may contain a zinc oxide whisker. The zinc oxide whisker can greatly improve grip on ice. It is desirable to use the zinc oxide whisker with the mixture of the zinc salt of the aliphatic carboxylic acid and the zinc salt of the aromatic carboxylic acid together because the reversion can be more suppressed.

The needle fiber length of the zinc oxide whisker is desirably 1 μm or more, and more desirably 10 μm or more. Also, the needle fiber length is desirably 5000 μm or less, and more desirably 1000 μm or less. If the needle fiber length is less than 1 μm, the grip on ice tends not to be improved. If the needle fiber length exceeds 5000 μm, the abrasion resistance tends to decrease greatly.

The needle fiber diameter (an average value) of the zinc oxide whisker is desirably 0.5 μm or more. Also, the needle fiber diameter is desirably 2000 μm or less, and more desirably 200 μm or less. If the needle fiber diameter is less than 0.5 μm, the grip on ice tends not to be improved. If the needle fiber diameter exceeds 2000 μm, the abrasion resistance tends to decrease greatly.

The amount of the zinc oxide whisker per 100 parts by mass of the rubber component is desirably 0.3 parts by mass or more, more desirably 1.3 parts by mass or more, and even more desirably 2.0 parts by mass or more. Also, the amount of the zinc oxide whisker per 100 parts by mass of the rubber component is desirably 30 parts by mass or less, and more desirably 15 parts by mass or less. If the amount is less than 0.3 parts by mass, the cross-linking efficiency and the grip on ice tend not to be improved. If the content exceeds 30 parts by mass, the abrasion resistance tends to decrease and the cost may unnecessarily increase.

The above tread has a JIS-A hardness of desirably 50 degrees or less, more desirably 48 degrees or less, and even more desirably 46 degrees or less. If the hardness is 50 degrees or less, it may be possible to ensure flexibility and better performance on ice and snow. Meanwhile, the hardness is desirably 40 degrees or more. If the hardness is less than 40 degrees, the processability of unvulcanized rubber tends to decrease and it may be difficult to ensure both handling stability and suitable hardness.

The rubber composition of the present invention can be used for studless tires of trucks and buses, and is desirably used for studless tires of passenger vehicles which require high handling stability on ice or snow. Furthermore, the rubber composition of the present invention can be suitably used for treads of studless tires.

With use of the rubber composition of the present invention, a studless tire can be produced by preparing a tire tread with use of the rubber composition, laminating the tread with other components, and heating it on a tire molding machine under pressure.

EXAMPLES

Although the present invention is more specifically described based on Examples, the present invention is not limited to these Examples.

In the following, respective chemical agents used in Examples and Comparative Examples are listed.

Natural rubber (NR): RSS #3

BR 1: BR 150B (cis-1,4 bond content: 97%, $ML_{1+4}$ (100° C.) 40, viscosity of a 5% solution in toluene at 25° C.: 48 cps, Mw/Mn: 3.3) produced by Ube Industries, Ltd.

BR 2: BR 360L (cis-1,4 bond content: 98%, $ML_{1+4}$ (100° C.) 51, viscosity of a 5% solution in toluene at 25° C.: 124 cps, Mw/Mn: 2.4) produced by Ube Industries, Ltd.

BR 3: BR A (trial piece, cis-1,4 bond content: 98%, $ML_{1+4}$ (100° C.): 47, viscosity of a 5% solution in toluene at 25° C.: 122 cps, Mw/Mn: 3.3) produced by Ube Industries, Ltd.

Carbon black: DIABLACK I (ISAF carbon, average particle size: 23 nm, DBP oil absorption: 114 ml/100 g) produced by Mitsubishi Chemical Corporation Silica: Ultrasil VN3 ($N_2SA$: 175 $m^2/g$) produced by Degussa Silane coupling agent: Si-69 produced by Degussa Mineral oil: PS-32 (paraffinic process oil) produced by Idemitsu Kosan Co., Ltd.

Stearic acid: KIRI produced by NOF Corporation

Anti-reversion agent 1 (mixture of zinc salt of aliphatic carboxylic acid and zinc salt of aromatic carboxylic acid): Activator 73A [(i) zinc salt of aliphatic carboxylic acid: zinc salt of fatty acid ($C_8$ to $C_{12}$) derived from coconut oil, (ii) zinc salt of aromatic carboxylic acid: zinc benzoate, content molar ratio: 1/1, zinc content: 17% by mass] produced by Struktol Company Anti-reversion agent 2: PERKALINK 900 (1,3-bis(citraconimidomethyl)benzene) produced by FLEXSYS Zinc oxide: Zinc oxide #2 produced by Mitsui Mining & Smelting Co., Ltd.

Zinc oxide whisker: PANATETRA WZ-0501 (the number of protrusions: 4, needle fiber length: 2 to 50 μm, needle fiber diameter (average value): 0.2 to 3.0 μm) produced by AMTEC Co., Ltd.

Antiaging agent: NOCRAC 6C (N-(1,3-dimethylbutyl)-N'-phenyl-p-phenylenediamine) produced by OUCHI SHINKO CHEMICAL INDUSTRIAL CO., LTD.

Wax: OZOACE wax produced by Nippon Seiro Co., Ltd.

Sulfur: Sulfur powder produced by Tsurumi Chemical Industry Co., Ltd.

Vulcanization accelerator BBS: NOCCELER NS (N-tert-buthyl-2-benzothiazolylsulfenamide) produced by OUCHI SHINKO CHEMICAL INDUSTRIAL Co., LTD.

Vulcanization accelerator DPG: NOCCELER D (N,N'-diphenylguanidine) produced by OUCHI SHINKO CHEMICAL INDUSTRIAL Co., LTD.

Examples 1 to 16 and Comparative Examples 1 to 12

A Banbury mixer was charged with the chemical agents in amounts shown in Process 1 in Table 1 and they were mixed and kneaded for five minutes so as to raise the outlet temperature to about 150° C. Thereafter, the sulfur and the vulcanization accelerator in amounts shown in Process 2 were added to the mixture obtained by Process 1, and they were mixed and kneaded for three minutes at about 80° C. by an open roll mill. Thereby, an unvulcanized rubber composition was obtained. This unvulcanized rubber composition was formed into a tread shape, laminated with other tire components, and then vulcanized for 15 minutes at 170° C., whereby studless tires in the respective Examples 1 to 16 and Comparative Examples 1 to 12 were produced.

The respective samples were evaluated by the following methods.

(Reversion)

Using a curelastometer, a vulcanization curve of the unvulcanized rubber composition at 170° C. was determined. The maximum torque rise (MH-ML) was regarded as 100, and a torque rise obtained 15 minutes after the start of vulcanization was expressed as a relative value. Then, a value obtained by subtracting the relative value from 100 was regarded as a reversion ratio. A lower reversion ratio shows that the reversion is more suppressed and better reversion resistance is achieved.

(Hardness)

In accordance with JIS K 6253 "Rubber, vulcanized or thermoplastic—Determination of hardness", the hardness of vulcanized rubber samples in the respective Examples and Comparative Examples was determined by a type A durometer.

(Performance on Ice and Snow)

Using the studless tires of the respective Examples and Comparative Examples, actual vehicle performance on ice and snow was evaluated under the following conditions. Here, studless tires for a passenger vehicle, which have a size of 195/65 R15 and a DS-2 pattern, were produced and the tires were mounted on a 2000 cc FR car made in Japan. The test was run on the test course of Sumitomo Rubber Industries, Ltd. in Nayoro, Hokkaido, Japan. The temperature on ice was from −6 to −1° C. and the temperature on snow was from −10 to −2° C.

Handling performance (evaluation of feeling): Starting, accelerating and stopping of the above car were evaluated by a test driver's feelings. In the evaluation, Comparative Example 1 was regarded as the standard, which was graded 100. Then, grading was performed in such a manner that the tires were graded 120 if the test driver judged that their performance was obviously improved, and the tires were graded 140 if the test driver judged that they were at a high level never seen before.

Braking performance (brake stopping distance on ice): The stopping distance on ice, which is the distance required for the car to stop after stepping on brakes that lock up at 30 km/h, was measured. Then, Comparative Example 1 was taken as a reference and the performance was calculated from the following equation:

(Braking performance index)=(Brake stopping distance in Comparative Example 1)/(Stopping distance)×100.

(Abrasion Resistance)

The tires with a size of 195/65 R15 were mounted on a FF car made in Japan, and the depth of grooves on the tire tread part was measured after the car had run 8000 km. The running distance that makes the depth of the tire grooves decrease by 1 mm was calculated, and the abrasion resistance was expressed with an index calculated from the following equation:

(Abrasion resistance index)=(Running distance at which groove depth is decreased by 1 mm)/(Running distance at which tire groove depth in Comparative Example 1 is decreased by 1 mm)×100.

A larger index shows better abrasion resistance.

Table 1 shows evaluation results of the respective tests.

TABLE 1

| | | | | | | | | | Examples | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Amount (parts by mass) | Process 1 | NR | 60 | 50 | 40 | 40 | 40 | 40 | 40 | 40 | 40 | — | — | — | — | — |
| | | BR1 | 40 | 50 | 60 | 60 | 60 | 60 | — | — | — | 100 | — | — | — | — |
| | | BR2 | — | — | — | — | — | — | 60 | 60 | — | — | 100 | 100 | — | — |
| | | BR3 | — | — | — | — | — | — | — | — | 60 | — | — | — | 100 | 100 |
| | | Carbon black | 30 | 30 | 30 | 30 | 30 | 30 | 30 | 5 | 5 | 30 | 30 | 5 | 30 | 5 |
| | | Silica | 25 | 25 | 25 | 25 | 25 | 25 | 25 | 50 | 50 | 25 | 25 | 50 | 25 | 50 |
| | | Silane coupling agent | 2.0 | 2.0 | 2.0 | 2.0 | 2.0 | 2.0 | 2.0 | 4.0 | 4.0 | 2.0 | 2.0 | 4.0 | 2.0 | 4.0 |
| | | Mineral oil | 25 | 25 | 25 | 25 | 25 | 25 | 25 | 25 | 25 | 25 | 25 | 25 | 25 | 25 |
| | | Stearic acid | 1 | 1 | 1 | 1 | 1 | — | 1 | 1 | 1 | 1 | 1 | 1 | 1 | 1 |
| | | Anti-reversion agent 1 | 3 | 3 | 3 | 0.7 | 5 | 3 | 3 | 3 | 3 | 3 | 3 | 3 | 3 | 3 |
| | | Anti-reversion agent 2 | — | — | — | — | — | — | — | — | — | — | — | — | — | — |
| | | Zinc oxide | 3 | 3 | 3 | 3 | 3 | 3 | 3 | 3 | 3 | 3 | 3 | 3 | 3 | 3 |
| | | Zinc oxide whisker | — | — | — | — | — | — | — | — | — | — | — | — | — | — |
| | | Antiaging agent | 1.5 | 1.5 | 1.5 | 1.5 | 1.5 | 1.5 | 1.5 | 1.5 | 1.5 | 1.5 | 1.5 | 1.5 | 1.5 | 1.5 |
| | | Wax | 1 | 1 | 1 | 1 | 1 | 1 | 1 | 1 | 1 | 1 | 1 | 1 | 1 | 1 |
| | Process 2 | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| | | Vulcanization accelerator BBS | 1.0 | 1.0 | 1.0 | 1.0 | 1.0 | 1.0 | 1.0 | 1.0 | 1.0 | 1.0 | 1.0 | 1.0 | 1.0 | 1.0 |
| | | Vulcanization accelerator DPG | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation | | Reversion ratio | 1.4 | 0.5 | 0 | 6 | 0 | 0 | 0 | 0 | 0 | 0.9 | 0.5 | 0.3 | 0.4 | 0.2 |
| | | Hardness | 46 | 46 | 47 | 47 | 48 | 47 | 47 | 46 | 45 | 48 | 48 | 47 | 47 | 46 |
| | | Handling performance (on snow) | 125 | 133 | 140 | 125 | 142 | 140 | 141 | 148 | 153 | 133 | 134 | 131 | 134 | 131 |
| | | Braking performance (on ice) | 102 | 107 | 111 | 111 | 110 | 113 | 110 | 123 | 123 | 130 | 127 | 140 | 132 | 145 |
| | | Abrasion resistance | 107 | 106 | 106 | 101 | 107 | 108 | 116 | 106 | 109 | 96 | 106 | 101 | 106 | 101 |

| | | | Examples | | Comparative Examples | | | | | | | | | | |
|---|---|---|---|---|---|---|---|---|---|---|---|---|---|---|---|
| | | | 15 | 16 | 1 | 2 | 3 | 4 | 5 | 6 | 7 | 8 | 9 | 10 | 11 | 12 |
| Amount (parts by mass) | Process 1 | NR | 40 | 0 | 60 | 60 | 50 | 50 | 40 | 40 | — | — | 100 | 100 | 100 | 70 |
| | | BR1 | 60 | 100 | 40 | 40 | 50 | 50 | 60 | 60 | 100 | 100 | — | — | — | 30 |
| | | BR2 | — | — | — | — | — | — | — | — | — | — | — | — | — | — |
| | | BR3 | — | — | — | — | — | — | — | — | — | — | — | — | — | — |
| | | Carbon black | 30 | 30 | 30 | 30 | 30 | 30 | 30 | 30 | 30 | 30 | 30 | 30 | 30 | 30 |
| | | Silica | 25 | 25 | 25 | 25 | 25 | 25 | 25 | 25 | 25 | 25 | 25 | 25 | 25 | 25 |
| | | Silane coupling agent | 2.0 | 2.0 | 2.0 | 2.0 | 2.0 | 2.0 | 2.0 | 2.0 | 2.0 | 2.0 | 2.0 | 2.0 | 2.0 | 2.0 |
| | | Mineral oil | 25 | 25 | 25 | 25 | 25 | 25 | 25 | 25 | 25 | 25 | 25 | 25 | 25 | 25 |
| | | Stearic acid | 1 | 1 | 1 | 1 | 1 | 1 | 1 | 1 | 1 | 1 | 1 | 1 | 1 | 1 |

TABLE 1-continued

|  |  |  | | | | | | | | | | | | | | |
|---|---|---|---|---|---|---|---|---|---|---|---|---|---|---|---|---|
| | | Anti-reversion agent 1 | 3 | 3 | — | — | — | — | — | — | — | — | — | 3 | — | 3 |
| | | Anti-reversion agent 2 | — | — | — | 1 | — | 1 | — | 1 | — | 1 | — | — | 1 | — |
| | | Zinc oxide | 3 | 3 | 3 | 3 | 3 | 3 | 3 | 3 | 3 | 3 | 3 | 3 | 3 | 3 |
| | | Zinc oxide whisker | 5 | 5 | — | — | — | — | — | — | — | — | — | — | — | — |
| | | Antiaging agent | 1.5 | 1.5 | 1.5 | 1.5 | 1.5 | 1.5 | 1.5 | 1.5 | 1.5 | 1.5 | 1.5 | 1.5 | 1.5 | 1.5 |
| | | Wax | 1 | 1 | 1 | 1 | 1 | 1 | 1 | 1 | 1 | 1 | 1 | 1 | 1 | 1 |
| | Process 2 | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| | | Vulcanization accelerator BBS | 1.0 | 1.0 | 1.0 | 1.0 | 1.0 | 1.0 | 1.0 | 1.0 | 1.0 | 1.0 | 1.0 | 1.0 | 1.0 | 1.0 |
| | | Vulcanization accelerator DPG | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation | | Reversion ratio | 0 | 0.2 | 15 | 7 | 11 | 9 | 13 | 11 | 9 | 9 | 13 | 1 | 9 | 2 |
| | | Hardness | 48 | 49 | 46 | 46 | 45 | 45 | 46 | 46 | 46 | 46 | 43 | 45 | 44 | 44 |
| | | Handling performance (on snow) | 140 | 138 | 100 | 102 | 105 | 106 | 110 | 111 | 112 | 112 | 90 | 100 | 95 | 115 |
| | | Braking performance (on ice) | 130 | 140 | 100 | 100 | 103 | 103 | 109 | 109 | 129 | 126 | 90 | 90 | 87 | 96 |
| | | Abrasion resistance | 108 | 99 | 100 | 103 | 97 | 99 | 94 | 95 | 81 | 84 | 110 | 116 | 114 | 110 |

In each of the samples of Examples, the reversion ratio was low and the reversion resistance was good. Furthermore, the hardness was appropriate and each achieved both high handling performance on snow and high braking performance on ice. Particularly, the samples with the higher BR content or with the higher silica content achieved higher braking performance on ice and good handling performance on snow.

Furthermore, in Examples 7 to 9 and 11 to 14, the abrasion resistance greatly increased because of blending with the BR having a cis content of 95% or more, a viscosity of a 5% solution in toluene of 80 cps or more and 200 cps or less (particularly 110 to 150 cps) at 25° C., and a Mw/Mn of 3.0 or less or a Mw/Mn of 3.0 to 3.4. Thus, even the rubber composition containing much silica was able to ensure the abrasion resistance and utility. Furthermore, the reversion resistance was further improved using the mixture of the zinc salt of the aliphatic carboxylic acid and the zinc salt of the aromatic carboxylic acid with such BR. Therefore, particularly in the example with high BR content, the good abrasion resistance was ensured and, at the same time, the excellent handling performance and braking performance on ice were exerted.

Furthermore, in Examples 15 and 16 in which the zinc oxide whisker was used in combination, the braking performance on ice was further more improved and the reversion resistance was further improved.

On the other hand, in Comparative Examples 1, 3, 5 and 7 in which no anti-reversion agent was blended in the BR-containing composition, the reversion ratio was high, that is, the reversion resistance was poor, and the handling performance was poor. In Comparative Examples 2, 4, 6 and 8 in which the anti-reversion agent 2 was blended in the BR-containing composition, the handling stability was poor and the reversion resistance was somewhat poor.

In Comparative Example 9, in which no anti-reversion agent was blended in the composition containing only the NR as the rubber component, and Comparative Example 11, in which the anti-reversion agent 2 was blended in the composition containing only the NR as the rubber component, the reversion resistance was poor and also the handling performance and braking performance on ice and snow were poor. In Comparative Example 10 in which the anti-reversion agent 1 was blended in the composition containing only the NR as the rubber component, although the reversion resistance was good, the handling performance on snow and the braking performance on ice were poor.

Furthermore, in Comparative Example 12 in which the anti-reversion agent 1 was blended in the composition with low BR content of 30% by mass, although the reversion resistance was good, the handling performance on snow and the braking performance on ice were poor.

INDUSTRIAL APPLICABILITY

The studless tire according to the present invention can achieve both good braking force and high handling stability on ice or snow because the studless tire is produced using a rubber composition for the studless tire, the rubber composition containing a mixture of a zinc salt of an aliphatic carboxylic acid and a zinc salt of an aromatic carboxylic acid; an oil or a plasticizer; and a rubber component that comprises 40% by mass or more of a butadiene rubber relative to 100% by mass of a total amount of the rubber component.

The invention claimed is:

1. A studless tire comprising a tread made of a rubber composition containing:
    a rubber component that comprises 55% by mass or more of a butadiene rubber relative to 100% by mass of a total amount of the rubber component;
    0.2 to 10 parts by mass of a mixture of
        a zinc salt of an aliphatic carboxylic acid having 4 to 16 carbon atoms and
        a zinc salt of an aromatic carboxylic acid which is at least one member selected
        from the group consisting of benzoic acid, phthalic acid and naphthoic acid per 100 parts by mass of the rubber component; and
    5 to 60 parts by mass of an oil or a plasticizer per 100 parts by mass of the rubber component.

2. The studless tire according to claim 1, wherein the rubber composition further contains silica in an amount of 10 parts by mass or more per 100 parts by mass of the rubber component.

3. The studless tire according to claim 1, wherein said rubber component in the rubber composition, which comprises 55% by mass or more of a butadiene rubber relative to 100% by mass of the total amount of the rubber component, further contains a natural rubber and/or an epoxidized natural rubber.

4. The studless tire according to claim 1, wherein the rubber composition further contains, per 100 parts by mass of the rubber component, silica in an amount of 10 to 150 parts by mass and carbon black in an amount of 2 to 120 parts by mass.

5. The studless tire according to claim 1, wherein the rubber composition further contains zinc oxide whiskers in an amount of 0.3 to 30 parts by mass per 100 parts by mass of the rubber component.

6. The studless tire according to claim 1, wherein the tread has a JIS-A hardness of 40 to 50 degrees.

* * * * *